(12) United States Patent
Duong

(10) Patent No.: US 8,848,021 B2
(45) Date of Patent: Sep. 30, 2014

(54) REMOTE PARTICIPANT PLACEMENT ON A UNIT IN A CONFERENCE ROOM

(75) Inventor: Nghiep Duy Duong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 13/354,152

(22) Filed: Jan. 19, 2012

(65) Prior Publication Data
US 2013/0188007 A1    Jul. 25, 2013

(51) Int. Cl.
*H04N 7/14*    (2006.01)

(52) U.S. Cl.
USPC .............. 348/14.07; 348/14.08; 370/260; 379/202.01; 709/204; 715/716; 715/733

(58) Field of Classification Search
USPC ............................................. 348/14.01–14.16
See application file for complete search history.

(56) References Cited

U.S. PATENT DOCUMENTS

| | | | |
|---|---|---|---|
| 6,128,649 A | 10/2000 | Smith et al. | |
| 7,092,002 B2 | 8/2006 | Ferren et al. | |
| 7,668,907 B1 | 2/2010 | Janakiraman et al. | |
| 7,692,680 B2 | 4/2010 | Graham et al. | |
| 7,707,247 B2 | 4/2010 | Dunn et al. | |
| 8,571,192 B2 * | 10/2013 | Etter | 379/202.01 |
| 2003/0058805 A1 | 3/2003 | Meyerson et al. | |
| 2007/0188596 A1 * | 8/2007 | Kenoyer | 348/14.08 |
| 2008/0228480 A1 | 9/2008 | Maegawa | |
| 2010/0245532 A1 * | 9/2010 | Kurtz et al. | 348/14.03 |
| 2013/0278631 A1 * | 10/2013 | Border et al. | 345/633 |

OTHER PUBLICATIONS

"Knowledge Driven Health: Unified Communications for Caregiver Collaboration", Retrieved on: Oct. 20, 2011, Available at: http://download.microsoft.com/download/0/f/d/0fd9e62d-56cf-4413-a58a-d45802e2439f/UCDatasheet.pdf.

* cited by examiner

*Primary Examiner* — Mohammad Islam
(74) *Attorney, Agent, or Firm* — Andrew Smith; Micky Minhas

(57) ABSTRACT

A video conferencing system presents video conference feeds of remote participants in different video conferencing units that are located throughout a conference room. Each of the available units is located at a different position within the conference room. At any point in time, a remote participant is associated with one of the units. The remote participant may move and/or be moved to a different unit during the video conference. For example, a presenter may ask the remote participant to "sit" at a particular unit and/or the remote participant may decide to move to a different unit within the room. Each of the units is configured to determine when a local participant is addressing a remote participant that is associated with the unit. When more than one remote participant is associated with a particular unit, the remote participant who is being communicated with may be shown prominently on the display.

20 Claims, 7 Drawing Sheets

REMOTE PARTICIPANT PLACEMENT ON A UNIT IN A CONFERENCE ROOM

BACKGROUND

Video conferencing continues to be increasingly used by individuals and businesses. Various video conferencing systems have been developed for this purpose. In many video conferencing systems, a camera is placed above a display that is mounted on a wall of the video conference room and that is directed at local video conference participants. The camera captures video images of the local participants sitting around the table which are then transmitted to one or more remote participants. The participants in the video conference often view incoming video from remote sites on the display. The remote participants are many times left out of a conversation among the local participants.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

A video conferencing system presents video conference feeds of remote participants in different video conferencing units that are located throughout a conference room. Each of the available video conferencing units is located at a different position within the conference room. For example, one or more video conferencing units may be placed at a location on/near a conference table, a unit may be placed near a whiteboard, a unit may be placed on a wall of the conference room, a unit may be placed to view an entrance of the conference room, and the like. At any point in time, a remote participant is associated with one of the units. The remote participant may move and/or be moved to a different unit during the video conference. For example, a presenter may ask the remote participant to "sit" at a particular unit and/or the remote participant may decide to move to a different unit within the room. Each of the units is configured to determine when a local participant is addressing a remote participant that is associated with the unit. When more than one remote participant is associated with a particular unit, the remote participant who is being communicated with may be shown more prominently on the display.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
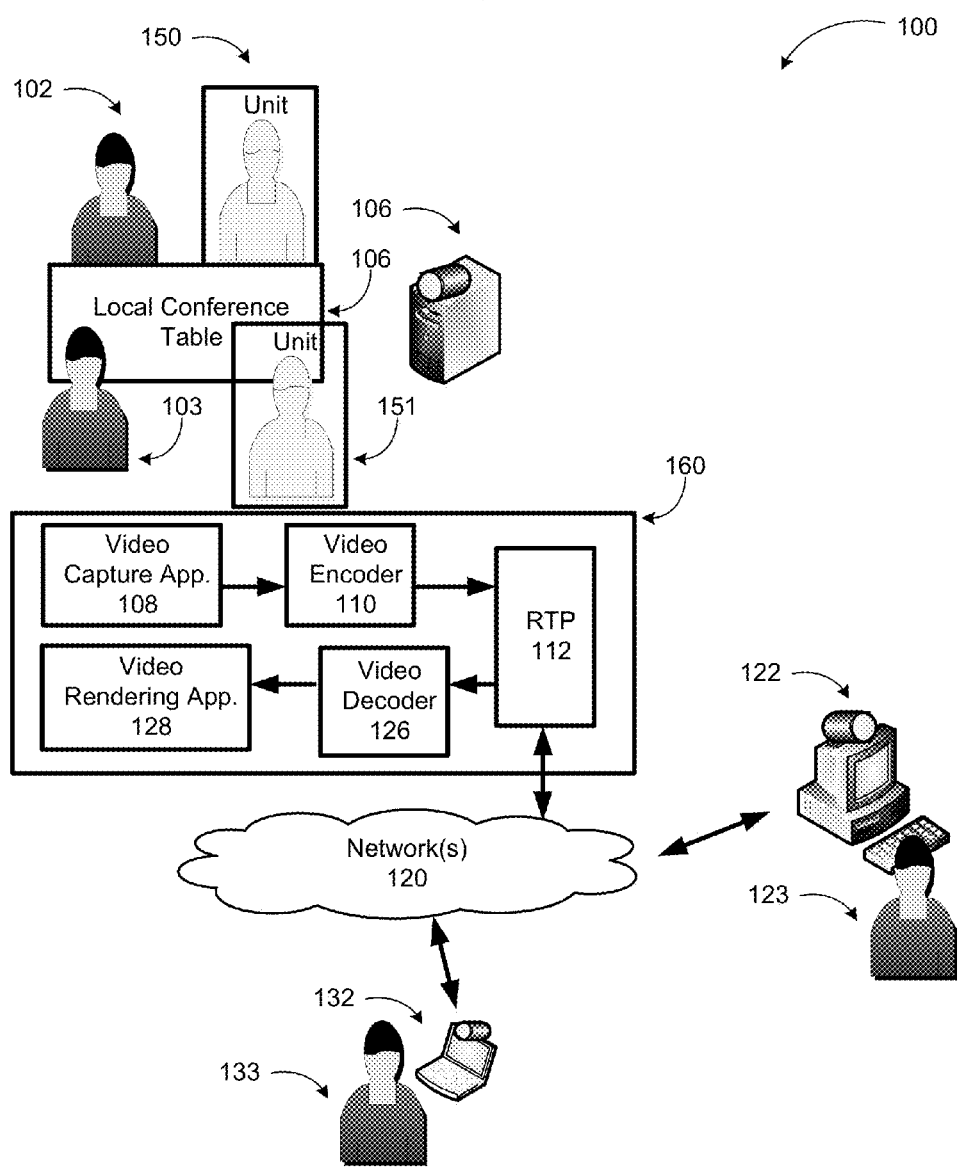
FIG. 1 illustrates a video conference system.

Referring to FIG. 1, video conference system 100 is illustrated. With the proliferation of Internet-based communication tools and applications, video applications that provide video communication over private or public networks have grown in number and variety. Such applications may be applications residing on computing devices (e.g. 106, 107, 122 and 132) or hosted applications executed by a service and used by a device/application remotely.

Video conferencing systems allow for meetings to occur with visual interaction despite the fact that meeting participants may be located in different geographic locations. Local participants are meeting participants that are physically located in a same room. Remote participants are meeting participants that are not physically in a same room. The visual aspect of video conferencing makes it typically more appealing than telephone conferences, while at the same time being a lower-cost alternative to (and typically can occur on shorter notice than) in-person meetings when one or more participants must travel to the meeting location. Some video conferencing systems use automated detection techniques or presets to move the camera (e.g., pan or tilt the camera) for focusing on specific regions or people if multiple people are participating in one location.

Many videoconferencing systems separate the location of the camera that captures video of the local participants from the display of incoming video feeds from remote participants so that the local participants (e.g. 102, 103) must look in a different direction from the camera in order to see the display of incoming video for the remote participants (e.g. 123, 133). This disrupts the simulation of face-to-face interaction. For example, a camera/telephone device sits in the center of a conference-room table and is taking video of the people and activity around the table while the display of the video feed of remote participants is projected onto a wall. As a result, the people around the conference table are looking away from the camera in order to see the video display of the remote participants. From the remote participant's perspective, people in the conference rooms that are participating in the video conference are looking away.

To help in providing a more face-to-face feel to a meeting, video conferencing units, such as units 150 and 151 in FIG. 1 captures video/audio of local participants based on the unit's perspective and displays incoming video conference feeds of remote participants. For example, unit 150 may display a video conference feed from remote participant 123 and unit 151 may display a video conference feed from remote participant 133. One or more cameras are mounted in/on the unit in order to capture video of the local participants. In this way, the local participants and remote participants of the video conference appear to be looking at each other. Each of the video conferencing units also includes one or more speakers and microphones. In this way, when a remote participant speaks, the sound from the remote participant comes from the video conferencing unit that is associated with the remote participant and not from the other video conferencing units. The microphone(s) that are associated with a video conferencing unit are used to receive sound and to assist in detecting what video conferencing unit sound detection from one or more microphones 356 to detect the location of the speaker among multiple people.

In FIG. 1, computing device 106 represent a computer (e.g. a server) that may be used in conjunction with conferencing units 150 and 151. Computing device 106 may be coupled to incoming/outgoing sources for the video conference feeds. Conferencing units (150 and 151) include one or more cameras for capturing local participants and a display that is incorporated with the camera for displaying video feeds. The camera system may be designed many different ways. For example, the camera system may be designed to capture a similar view of the conference room as what would be seen by a local participant if that participant was placed at the location of the conferencing unit. One or more cameras may be included in units (150, 151). According to an embodiment, units 150 and 151 are standalone devices that include one or more cameras for capturing video images of the local participants sitting around a conference table, one or more microphones/speakers and a display to display incoming video feeds from remote participants. The camera may be mounted on the unit at different locations. For example, a unit may include a pedestal for positioning the camera and display at an appropriate level (e.g. eye level with the local participants). The camera(s), display(s), microphone(s), speaker(s) may be included in an integrated unit and/or separate units. The camera(s) may be mounted above the display or in some other location. For example, the cameras may be mounted within the display such that the camera and the display are at the approximately same level. The camera(s) may also be integrated on the surface of the display and/or slightly offset from the surface. Generally, the camera system and display system is designed such that the local participants of the conference may look directly at the unit and see the incoming video conference feed from one or more remote participants.

A typical video communication is illustrated in box 160 and begins with a video capture application 108, which captures frames of video through a video conferencing unit (e.g. unit 150 and 151). The video signal may first be passed through one or more processing blocks for filtering, backlighting adjustments, and the like. The processed video signal is encoded in video encoder 110 for transmission over a network and provided to Real Time Protocol (RTP) block 112 for formatting the signal to be transported over the network. Any one of a number of network transportation protocols may be employed to transmit the signal to a receiving device (e.g. computing device 122).

Incoming video signals from remote sites are received by RTP block 112 at the receiving device and translated. Video decoder 126 decodes the signal and provides the decoded signal to rendering application 128, which renders it on a surface of the display of the units. Rendering application 128, or some other application/hardware, may perform processing (e.g. adjusting for display type, animation, effects, lighting, and the like) on the incoming video signals before they are displayed. For example, the incoming video signals may be processed such that the video signals do not appear to be distorted.

As illustrated in units 150 and 151, the incoming video feeds from the remote participants are displayed on a video display that also includes a camera system that is used to capture video signals that are transmitted to the remote participants.

Network(s) 120 may include private or public networks and may include a secure network such as an enterprise network, an unsecure network such as a wireless open network, or the Internet. Network(s) 120 provide communication between the participants. By way of example, and not limitation, network(s) 120 may include wired media such as a wired network or direct-wired connection, and wireless media such as acoustic, RF, infrared and other wireless media.

In the current example, local participants 102 and 103 are seated at a local conference table 106. Remote participants 123 and 133 are also virtually "seated" at the local conference table and each displayed on one of the units (e.g. remote participant 123 on unit 150 and remote participant 133 on unit 151). As can be seen, each of the available video conferencing units is located at a different position within the conference room. In the current example, the units are placed on/near the local conference table. More units may be included. For example, one or more video conferencing units may be placed near a whiteboard in the room, unit(s) may be placed on walls of the conference room, a unit may be placed to view an entrance of the conference room, and the like.

At any point in time, a remote participant is associated with a single one of the units. The remote participant may move and/or be moved to a different unit during the video conference. For example, a presenter may ask the remote participant to "sit" at a particular unit and/or the remote participant may decide to move to a different unit within the room. Each of the units is configured to determine when a local participant is addressing a remote participant that is associated with the unit. When more than one remote participant is associated with a particular unit, the remote participant who is being communicated with may be shown more prominently on the display and heard from the particular unit.

Figure 2:
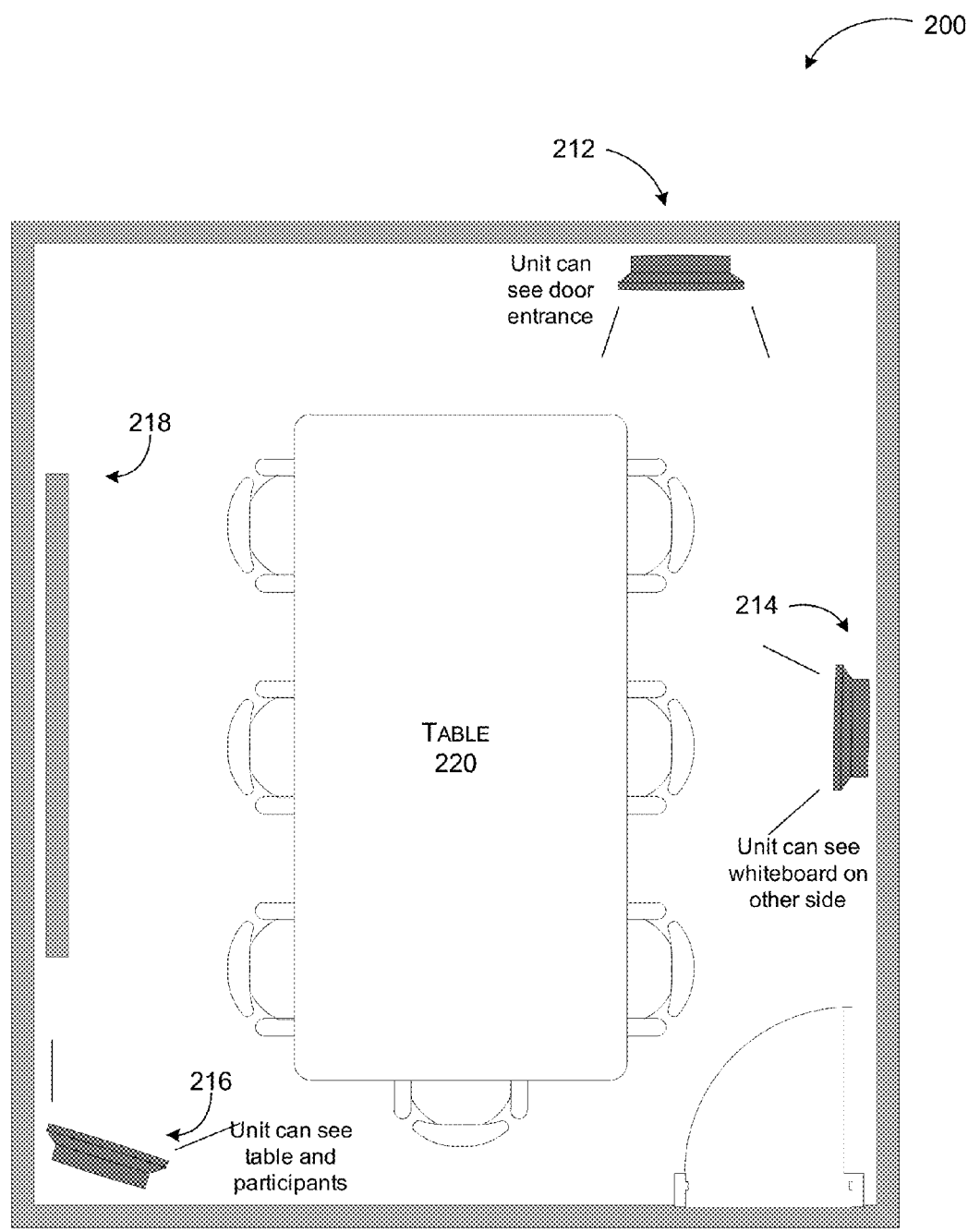
FIG. 2 shows an exemplary placement of video conferencing units.

FIG. 2 shows an exemplary placement of video conferencing units. As illustrated, FIG. 2 includes conferencing units 212, 214 and 216. As described above, the conferencing units include both a camera for capturing local participants and a display for displaying video conference feeds of one or more remote participants. The conferencing units may include other functionality, such as: a microphone(s), speaker(s) processing capability, and the like.

The conferencing units (212, 214 and 216) are designed to be mounted on a wall, placed on a table (e.g. table 220), placed in a chair and the like. The conferencing units may be manufactured in different sizes. Generally, the size of the conferencing unit is designed such that it is not obtrusive to the local participants such that they can not see each other in the conference room. The camera may be any type of camera system that is designed to capture local participants of a video conference that may be situated in a conference room (e.g. sitting at a table). For example, conventional pan/tilt/zoom cameras, 360-degree panorama cameras (e.g., which can pan/tilt/zoom digitally rather than mechanically), and the like may be used.

The display for a conferencing unit is configured to display video feeds that may be arranged in a variety of ways. For example, the feeds may be displayed in a pattern, one after another, using only a portion of the display, the remote participant that is being communicated with, and the like. Generally, the feeds are displayed such that a local participant looks directly at the video conferencing device that also includes the camera.

In the current example, a remote participant may move from one unit to another based on what they are doing in the video conference. For example, when a remote participant is viewing a presentation on the whiteboard 218, they may be placed on unit 214. When a remote participant is presenting on the whiteboard, they may be placed on unit 216 and will be heard as speaking from unit 216. As discussed above, the remote participant may decide to move to another unit and/or be asked to move and/or be placed on another unit by another participant. For example, a conference organizer may select the unit to place the remote participant.

Figure 3:
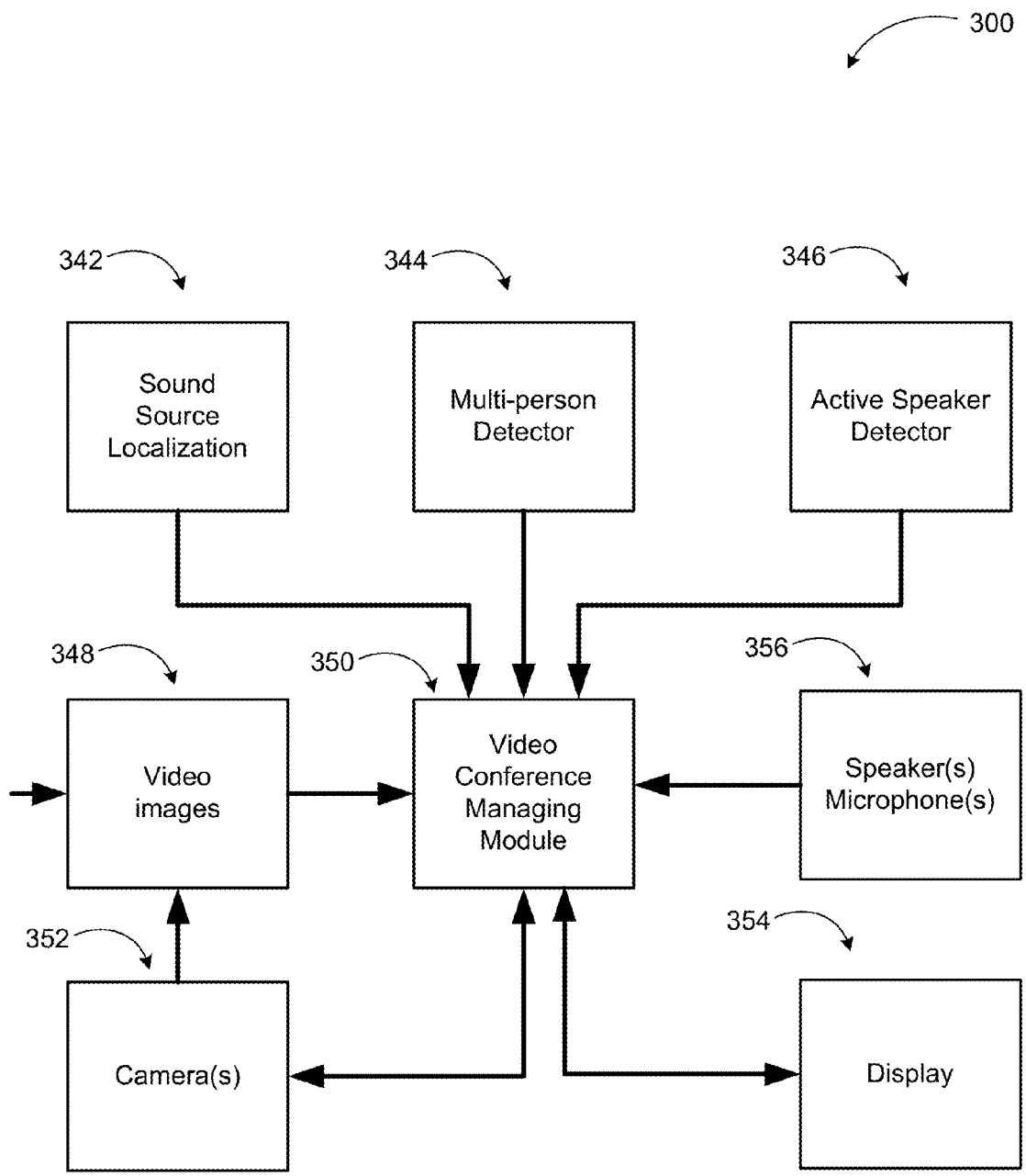
FIG. 3 illustrates a video conferencing system for capturing local participants and displaying incoming video conference feeds.

FIG. 3 illustrates a video conferencing system 300 for capturing local participants and displaying incoming video conference feeds. The video conferencing system 300 may be included within a single unit and/or spread among different units.

In a video conferencing system, one or more cameras 352 capture video images of participants in a video conference. Cameras 352 may be incorporated with a display 354 for showing a video signal, such as one or more incoming video feeds. A video conference managing module 350 may be used to manage the display and receipt/transmission of video conference feeds including video and/or audio. For example, module 350 may be used to animate/select one or more incoming video conference feeds (e.g. a remote participant) for display 354. According to one embodiment, display 354 is integrated into a conferencing unit. The display may include one or more display panels. For example, display 354 may have a fixed number of display panels. Module 350 may also be used to perform video/audio processing on the incoming/outgoing video conference feeds. For example, module 350 may be used to improve image quality such as enhancing a person or region of interest through adjustment of exposure and/or gain for that portion of the video frame. The sound source localization, multi-person, and active speaker detectors 342, 344, 346 use audio and/or visual cues to select a region of interest. Sound source localization detector 342 uses audio features such as sound detection from one or more microphones 356 to detect the location of the speaker among multiple people. The multi-person detector 344 uses motion and image features (such as contours of a person, facial recognition, etc.) to determine the speaker. The active speaker detector 346 uses sound source localization, motion, and image features to detect the current speaker. Module 350 may determine to highlight a video display of an incoming feed on display 354 more often when the video feed shows the speaker. For example, the video feed of the remote participant that is a speaker may be displayed larger on display 354 then the display of the other incoming feeds. Similarly, a remote participant who is being spoken to directly may be displayed larger on display 354. The incoming video feeds may be shown one after another, layered, in a pattern, and the like, on display 354. According to one embodiment, the feeds to show on display 354 may be selected. Module 350 may be implemented as hardware, software, or a combination of the two.

Figure 4:
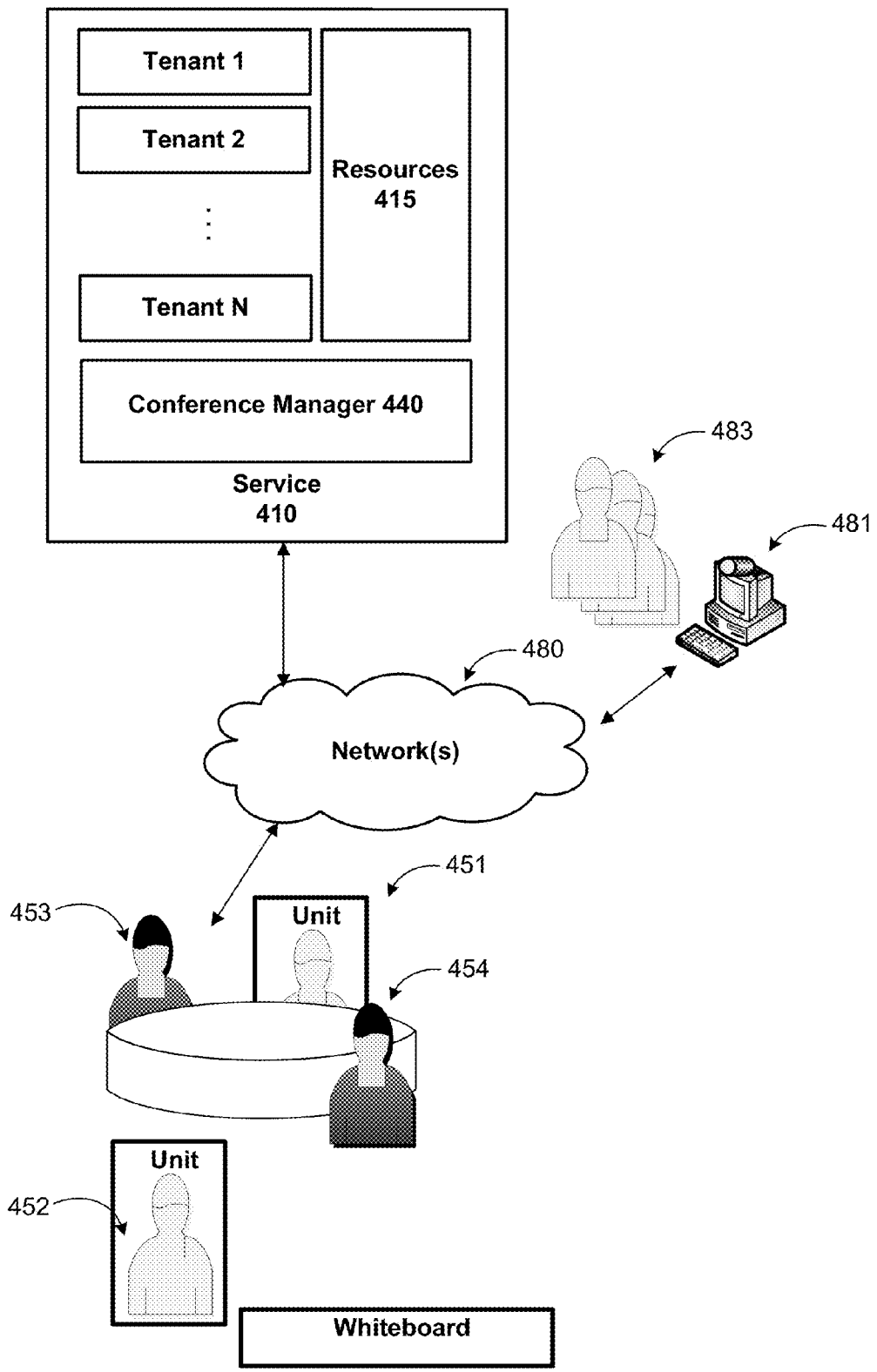
FIG. 4 shows a networked environment where embodiments of the video conferencing system may be implemented.

FIG. 4 shows a networked environment where embodiments of the video conferencing system may be implemented. One or more of the locations participating in the video conference may include conferencing units as described above. Such a system may comprise any topology of servers, clients, Internet service providers, and communication media. Also, the system may have a static or dynamic topology. While a networked system implementing embodiments may involve many more components, relevant ones are discussed in conjunction with this figure.

Video conferencing applications may be executed and video rendered in devices 481, 482, 451 and 452. If the video application is part of a communication application (or service such as service 410), the application or service may be managed by one or more servers.

As illustrated, service 410 is a cloud based and/or enterprise based video conference service that may be configured to provide other services (e.g. presentation services). Functionality of one or more of the services/applications provided by service 410 may also be configured as a client based application. For example, a video conferencing unit may be configured with a video conferencing application that performs operations as described herein. As illustrated, service 410 is a multi-tenant service that provides resources 415 and services to any number of tenants (e.g. Tenants 1-N). According to an embodiment, multi-tenant service 410 is a cloud based service that provides resources/services 415 to tenants subscribed to the service and maintains each tenant's data separately and protected from other tenant data.

As illustrated, multiple remote participants 483 are participating in a video conference with local participants 453 and 454. Each of the remote participants is placed on a single conferencing unit (e.g. unit 451 or unit 452). When more than one remote participant is placed on a unit, the display that is associated with the unit may show each/one of the remote participants that are on the unit. For example, during the video conference where a remote participant is not speaking and/or being directly addressed, the display may show an image of each remote participant. When a remote participant is speaking and/or being directly addressed, the display may show an image of the remote participant that is speaking and/or being addressed. A remote participant that is placed on one of the units may move to another unit (e.g. unit 452). For example, a remote participant may move to unit 452 and present using the whiteboard.

Conference manager 440 is configured to perform actions relating to the placement of remote participants on the conferencing units. For example, conference manager 440 may be configured to analyze video conference feeds and select a unit to place the remote participant. In response to a presenter asking the remote participant to "sit" at a particular unit, conference manager 440 may automatically move the remote participant to the requested unit. The conference manager may also be used to determine when a local participant is addressing a remote participant that is associated with a unit. When a local participant is addressing a remote participant that is associated with a unit, conference manager may change a display of the unit.

Figure 5:
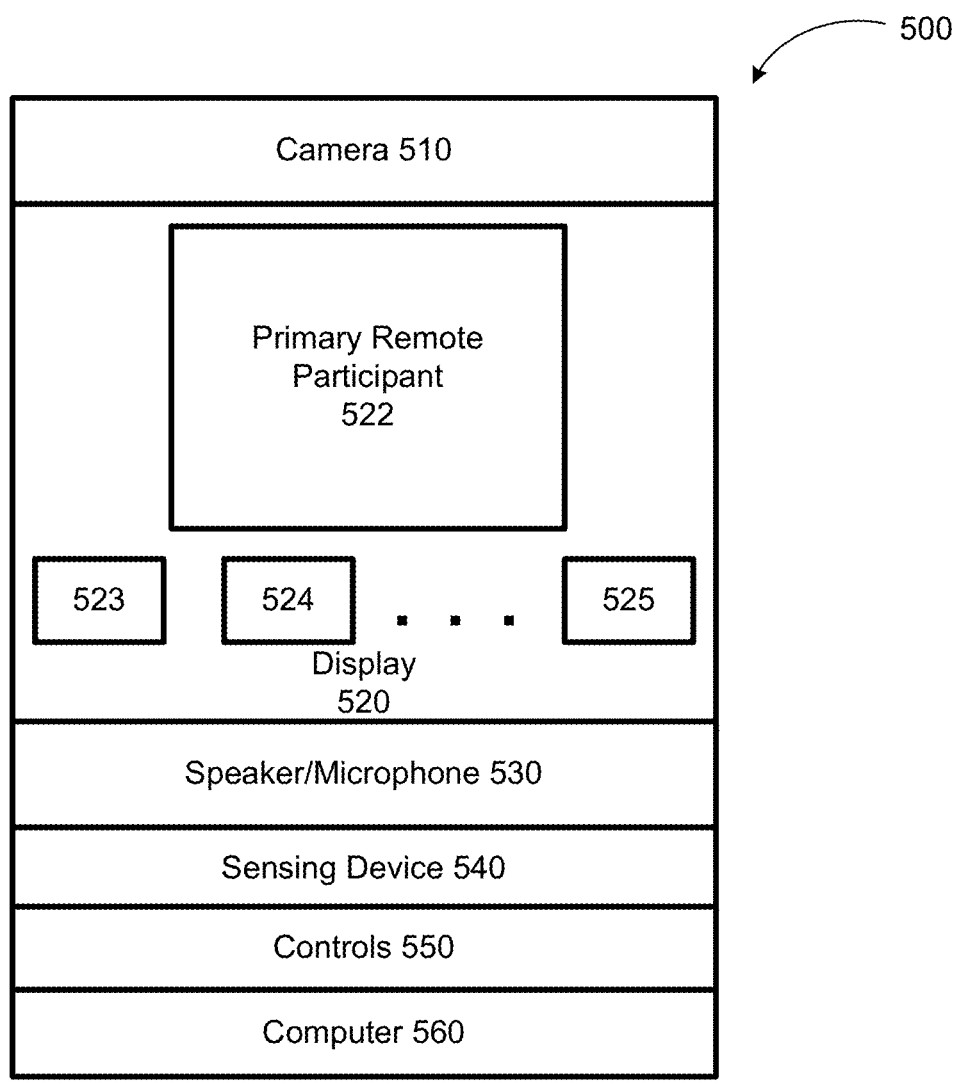
FIG. 5 shows an exemplary conferencing unit.

FIG. 5 shows an exemplary conferencing unit.

Conferencing unit 500 shows a video conferencing unit that comprises a camera 510, display 520, speaker(s) and microphone(s) 530, sensing device 540, controls 550 and computer 560 Camera 510 is illustrated above display 520. The camera(s), however, may be mounted at other locations. For example, camera 510 may be mounted within/behind the display such that the camera and the display are at the approximately same level. The camera(s) 510 may also be integrated on the surface of the display 520. The camera may also be located slightly above the display (e.g. 1-6 inches) or slightly below the display (e.g. 1-6 inches). According to an embodiment, camera 510 is located at approximately eye level as the participants in the local conference room.

The display of video conference feeds 522-525 are illustrated at the base of and on top of display 520. For example, the primary remote participant 522 (e.g. being directly addressed and/or speaking) is shown larger and more prominently on display 520. The non-primary participants (523-525) may/may not be shown. In the current illustration, the non-primary participants are displayed smaller along the bottom of the display. As discussed, the display of the remote participants may be arranged many different ways. While display 520 is shown as a flat display, the display may be other shapes. For example, display 520 may be a square, a rectangle, a triangle, a conical shape, circular, and the like. Further, a center pedestal may be used to hold the camera portion and/or the display portion and/or the control portion and/or computer 560. According to an embodiment, the positions of one or more of the different portions (e.g. camera, display, controls) are adjustable.

One or more speakers are included in conferencing unit 500. The speakers may be mounted at various locations. In this way, when a remote participant speaks, the sound from the remote participant comes from the conferencing unit that is associated with the remote participant. One or more microphones are included on conferencing unit that may be used to detect when the conferencing unit is being addressed. For example, computer 550 may be configured to detect the local participant that is the active speaker.

A sensing device 540 may be further operative to capture spoken words, such as by a microphone and/or capture other inputs from a user such as by gestures, touch, a keyboard and/or mouse (not pictured). The sensing device may comprise a motion detection device capable of detecting the movement of a user. For example, a camera may comprise a MICROSOFT KINECT® motion capture device comprising a plurality of cameras and a plurality of microphones.

Controls 550 are designed to control functionality of the conferencing unit. For example, controls may be adjusted to change characteristics of the display, sound, and the like.

Computer 560 is configured to perform operations relating to video conferencing. For example, computer 560 may be configured to provide functionality as described herein.

Figure 6:
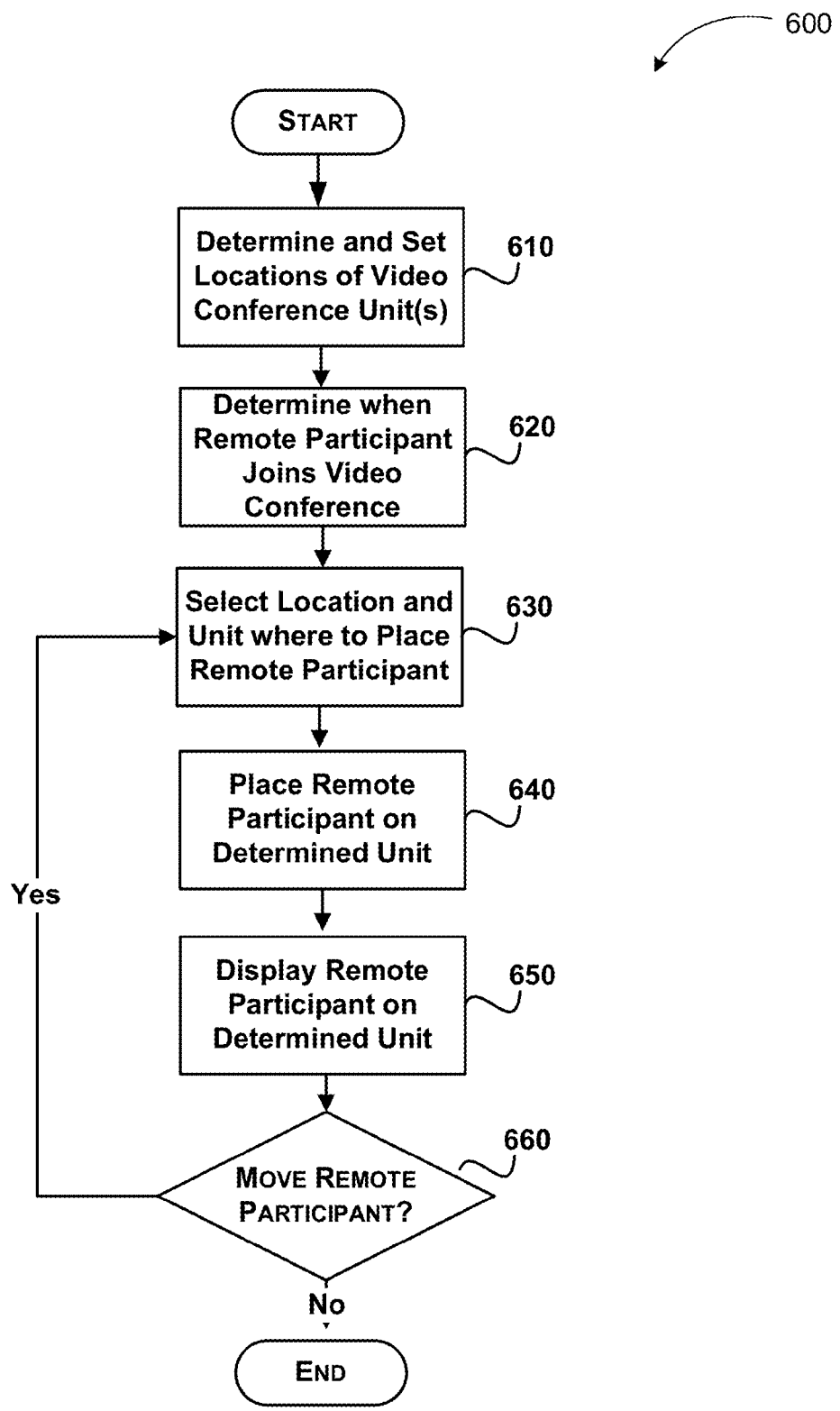
FIG. 6 shows an illustrative process for placing a remote participant in a local conference room.

Referring now to FIG. 6, an illustrative process for placing a remote participant in a local conference room will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the ordering of the operations may change and be performed in other orderings.

After a start operation, process 600 moves to operation 610, where locations to place video conference units are determined and placed. The units may be placed at a variety of different locations. For example, one or more units may be placed on a conference room wall, on a table, in chairs, and the like. A unit may be associated with one or more remote participants. Each remote participant is associated with a single unit at one time.

Moving to operation 620, a determination is made as to when a remote participant joins the video conference.

Flowing to operation 630, a location where to place the remote participant is determined. The remote participant may be placed manually/automatically. For example, a seating chart may be predetermined for participants, the remote participant may decide what conferencing unit to initially occupy, the presenter may select the conferencing unit, the remote participant may be automatically placed in a conferencing unit based on their role in the video conference and/or some other factor (e.g. seniority, job title, . . . ).

Transitioning to operation 640, the remote participant is placed on the determined unit. In other words, the video conference feed from the remote participant is associated with the determined unit where the remote participant is placed. In this way, local participants will be able to directly address the unit where the remote participant is "seated." The local participants will also have a general understanding of what the remote participant is able to see in the conference room based on what conferencing unit the remote participant occupies.

Moving to operation 650, the remote participant is displayed on the determined unit and when communicating, the remote participant is heard from the determined unit. The remote participant may be displayed all/part of the time during the video conference. For example, when a single remote participant is associated with a unit, then the remote participant may continually be displayed during the video conference. When more than one remote participant is associated with a unit then a remote participant may be displayed using some other display method. For example, when one of the remote participants that is associated with the unit is not talking or being talked to, each of the remote participants that is associated with the unit may be displayed in a tiled pattern and/or cycled through the display. When one of the remote participants associated with the unit is talking or is being specifically addressed, then that remote participant may be more prominently displayed (e.g. all/portion of the display).

Transitioning to decision operation 660, a determination is made as to whether to move the remote participant. When the remote participant is to be moved, the process flows to operation 630. When the remote participant is not to be moved, the process flows to an end block and returns to processing other actions.

Figure 7:
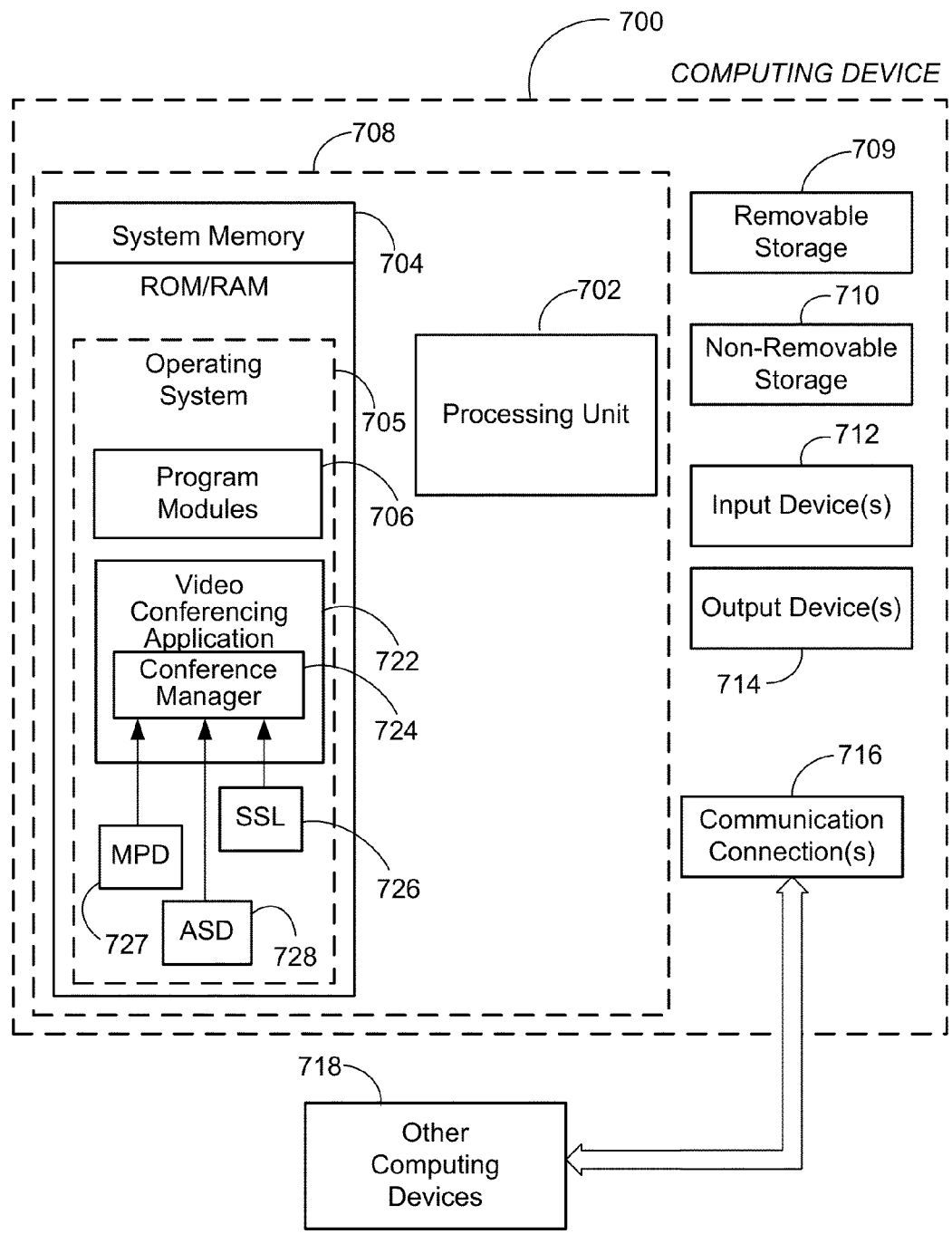
FIG. 7 shows an example computing environment.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a client device executing a video capture application and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706, video conferencing application 722 including a conference manager, automatic exposure/gain control module 724, and at least one of sound source localization, multi-person detection, and active speaker detection modules (726-728).

Video conferencing application 722 may be a separate application or an integral module of a hosted service application that receives incoming video conference feeds from remote and local sources. Such as receiving audio and video capture based on received video/audio signals from a video conference camera system associated with computing device 700. Automatic exposure/gain control module 724 provides exposure and/or gain control services for improving video image quality based on input from one of the modules 726-728. This basic configuration is illustrated in FIG. 7 by those components within dashed line 508.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 512 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include client devices or server(s) that execute applications associated with rendering video signals from video capture application 722 in computing device 700. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. While the presence of a modulated data signal may be transitory in nature, the signal is generated to cause changes in a receiving device, thereby creating physical and tangible changes (effects) during its reception by the receiving device. By way of example, and not limitation, communication media includes wired media such as a wired network or direct-wired connection, and wireless media such as acoustic, RF, infrared and other wireless media.

A touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display. An input/output controller may also provide output to one or more display screens, a printer, or other type of input/output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 700 on the single integrated circuit (chip).

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for placing a remote participant on a conferencing unit in a local conference room, comprising:

determining when a remote participant joins a video conference;
selecting a location within the local conference room to place the remote participant;
determining a conferencing unit from a plurality of conferencing units to display the remote participant based on the selected location within the local conference room;
placing the remote participant on the determined conferencing unit; and
changing the remote participant from the determined conferencing unit to a different conferencing unit in response to the remote participant virtually moving to a different location within the local conference room.

2. The method of claim 1, wherein selecting the location within the local conference room to place the remote participant comprises receiving the selection from at least one of: a local participant from within the local conference room and the remote participant.

3. The method of claim 1, wherein selecting the location within the local conference room to place the remote participant comprises determining the selection from at least one of: a seating chart; a job title; and a role in the video conference.

4. The method of claim 1, further comprising placing different remote participants on different conferencing units.

5. The method of claim 1, further comprising placing different remote participants on the conferencing unit, and when one of the remote participants that is placed on conferencing unit is being addressed, prominently displaying the remote participant that is being addressed on the conferencing unit.

6. The method of claim 1, further comprising placing the plurality of conferencing units throughout the local conference room such that each of the plurality of conferencing units has a different location within the local conference room.

7. A system for video conferencing, comprising:
conferencing units that are located within a conference room at different locations, wherein each conferencing unit, comprises:
a memory;
a communication device configured to transmit and receive video conference feeds over a network;
a camera that is coupled to the display and that is configured to capture frames of video;
a microphone;
a speaker; a processor coupled to the memory, the camera, the microphone, the speaker and the communication device and configured to execute operations, comprising:
receiving video frames from the camera;
receiving an incoming video conference feed from a remote participant; and
displaying the incoming video conference feed on the display;
and
a conference manager configured to perform actions, comprising:
determining when a remote participant joins a video conference;
determining a single conferencing unit from the conferencing units to display the remote participant based on a selected location within the local conference room;
placing the remote participant on the determined conferencing unit;
projecting sound from the remote participant on the determined conferencing unit when the remote participant speaks; and
changing the remote participant from the determined conferencing unit to a different conferencing unit in response to the remote participant virtually moving to a different location within the local conference room.

8. The system of claim 7, wherein each of the conferencing units is configured to determine when the remote participant that is placed on the determined conferencing unit is being addressed and when the remote participant is speaking.

9. The system of claim 7, wherein the selected location within the local conference room comprises receiving the selection from at least one of: a local participant from within the local conference room and the remote participant.

10. The system of claim 7, wherein the selected location within the local conference room to place the remote participant comprises determining the selection from at least one of: a seating chart; a job title; and a role in the video conference.

11. The system of claim 7, further comprising placing different remote participants on at least one of different conferencing units.

12. The system of claim 11, further comprising when one of the remote participants that is placed on conferencing unit is being addressed, prominently displaying the remote participant that is being addressed on the determined conferencing unit.

13. The system of claim 7, further comprising placing the conferencing units throughout the local conference room such that each of the conferencing units has a different location within the local conference room.

14. The system of claim 7, further comprising placing a single remote participant on each of the conferencing units.

15. A computer-readable device storing computer-executable instructions for placing a remote participant on a conferencing unit in a local conference room, comprising:
determining when a remote participant joins a video conference;
determining a conferencing unit from a plurality of conferencing units to display the remote participant and project sound from the remote participant;
placing the remote participant on the determined conferencing unit; and
changing the remote participant from the determined conferencing unit to a different conferencing unit in response to the remote participant virtually moving to a different location within the local conference room.

16. The computer-readable device of claim 15, further comprising selecting a location within the local conference room to place the remote participant.

17. The computer-readable device of claim 16, wherein selecting the location within the local conference room to place the remote participant comprises receiving the selection from at least one of: a local participant from within the local conference room and the remote participant.

18. The computer-readable device of claim 15, wherein selecting a location within the local conference room to place the remote participant comprises determining the selection from at least one of: a seating chart; a job title; and a role in the video conference.

19. The computer-readable device of claim 15, further comprising placing different remote participants on the conferencing unit, and when one of the remote participants that is placed on conferencing unit is being addressed, prominently displaying the remote participant that is being addressed on the conferencing unit.

20. The computer-readable device of claim 15, further comprising placing the plurality of conferencing units throughout the local conference room such that each of the plurality of conferencing units has a different location within the local conference room.

* * * * *